US010455575B2

United States Patent
Vos et al.

(10) Patent No.: US 10,455,575 B2
(45) Date of Patent: Oct. 22, 2019

(54) METHOD, APPARATUS AND SYSTEM FOR UPLINK RADIO RESOURCE ALLOCATION IN AN LTE COMMUNICATION SYSTEM

(71) Applicant: Sierra Wireless, Inc., Richmond (CA)

(72) Inventors: Gustav Gerald Vos, Surrey (CA); Steven John Bennett, Coquitlam (CA); Lutz Hans-Joachim Lampe, Vancouver (CA); Ghasem Naddafzadeh Shirazi, Vancouver (CA); Ramon Khalona, Carlsbad, CA (US)

(73) Assignee: SIERRA WIRELESS, INC., British Columbia (CA)

( * ) Notice: Subject to any disclaimer, the term of this patent is extended or adjusted under 35 U.S.C. 154(b) by 0 days.

(21) Appl. No.: 14/046,475

(22) Filed: Oct. 4, 2013

(65) Prior Publication Data

US 2014/0098781 A1 Apr. 10, 2014

Related U.S. Application Data

(60) Provisional application No. 61/710,466, filed on Oct. 5, 2012.

(51) Int. Cl.
*H04W 72/04* (2009.01)
*H04W 72/12* (2009.01)
(Continued)

(52) U.S. Cl.
CPC ....... *H04W 72/0446* (2013.01); *H04L 5/0012* (2013.01); *H04L 5/0037* (2013.01);
(Continued)

(58) Field of Classification Search
CPC ................. H04W 72/0446; H04W 72/0453
See application file for complete search history.

(56) References Cited

U.S. PATENT DOCUMENTS 5,732,348 A 3/1998 Norimatsu
6,188,911 B1 2/2001 Wallentin et al.
(Continued)

FOREIGN PATENT DOCUMENTS

CA 2710158 A1 7/2009
CN 101300767 A 11/2008
(Continued)

OTHER PUBLICATIONS

Hung H. Myung, Technical Overview of 3GPP LTE, May 18, 2008, Indian Institute of Technology, https://www.iith.ac.in/~tbr/teaching/docs/LTE-Tutorial.pdf.*
(Continued)

*Primary Examiner* — Sulaiman Nooristany
(74) *Attorney, Agent, or Firm* — Cooley LLP

(57) ABSTRACT

The present technology provides a method, apparatus and system for facilitating uplink communication from a user equipment (UE) to a base station in an LTE communication system. One or more frequency subcarriers within a predetermined LTE resource block are selected, covering less than the entire frequency range of the LTE resource block. The selected one or more frequency subcarriers are then used for communication from the UE to the base station.

20 Claims, 7 Drawing Sheets

(51) Int. Cl.
*H04L 5/00* (2006.01)
*H04L 27/26* (2006.01)
(52) U.S. Cl.
CPC .......... *H04L 5/0082* (2013.01); *H04L 5/0094* (2013.01); *H04L 27/2618* (2013.01); *H04W 72/1268* (2013.01)

(56) References Cited

U.S. PATENT DOCUMENTS

| | | | |
|---|---|---|---|
| 8,345,588 | B2 | 1/2013 | Adachi et al. |
| 9,219,994 | B2 | 12/2015 | Park et al. |
| 2004/0258014 | A1 | 12/2004 | Ro et al. |
| 2005/0286547 | A1 | 12/2005 | Baum et al. |
| 2006/0215588 | A1 | 9/2006 | Yoon |
| 2007/0067531 | A1 | 3/2007 | Kolinummi et al. |
| 2007/0098098 | A1 | 5/2007 | Xiao et al. |
| 2007/0155323 | A1 | 7/2007 | Matsumoto et al. |
| 2007/0171864 | A1 | 7/2007 | Zhang et al. |
| 2008/0013599 | A1 | 1/2008 | Malladi |
| 2008/0086669 | A1 | 4/2008 | Cheng et al. |
| 2008/0170526 | A1 | 7/2008 | Narang et al. |
| 2008/0268785 | A1 | 10/2008 | McCoy et al. |
| 2009/0046647 | A1 | 2/2009 | Roh et al. |
| 2009/0067531 | A1 | 3/2009 | Lee |
| 2009/0175226 | A1 | 7/2009 | Ren et al. |
| 2009/0176490 | A1 | 7/2009 | Kazmi et al. |
| 2009/0204863 | A1 | 8/2009 | Kim et al. |
| 2009/0221293 | A1 | 9/2009 | Petrovic |
| 2009/0280823 | A1 | 11/2009 | Petrovic et al. |
| 2010/0008310 | A1 | 1/2010 | Gerstenberger et al. |
| 2010/0008317 | A1 | 1/2010 | Bhattad et al. |
| 2010/0027492 | A1* | 2/2010 | Asanuma ............ H04L 5/0007 370/329 |
| 2010/0074130 | A1 | 3/2010 | Bertrand et al. |
| 2010/0182975 | A1* | 7/2010 | Malladi ............... H04L 1/1664 370/330 |
| 2010/0302106 | A1* | 12/2010 | Knudsen ............... H01Q 1/241 343/702 |
| 2010/0329159 | A1 | 12/2010 | Xia et al. |
| 2011/0034198 | A1* | 2/2011 | Chen .................... H04L 1/0029 455/509 |
| 2011/0164532 | A1 | 7/2011 | Kawamura et al. |
| 2011/0194510 | A1 | 8/2011 | Gaal et al. |
| 2011/0205982 | A1 | 8/2011 | Yoo et al. |
| 2011/0222525 | A1 | 9/2011 | Kishigami et al. |
| 2011/0223958 | A1* | 9/2011 | Chen .................... H04B 7/022 455/522 |
| 2011/0228883 | A1 | 9/2011 | Liu et al. |
| 2011/0235584 | A1 | 9/2011 | Chen et al. |
| 2012/0002541 | A1 | 1/2012 | Lee et al. |
| 2012/0008590 | A1* | 1/2012 | Novak ................. H04J 3/0682 370/330 |
| 2012/0020320 | A1* | 1/2012 | Issakov ................ G01S 5/0221 370/330 |
| 2012/0033595 | A1 | 2/2012 | Aoyama et al. |
| 2012/0082044 | A1 | 4/2012 | Lysejko et al. |
| 2012/0122467 | A1 | 5/2012 | Auer |
| 2012/0163208 | A1 | 6/2012 | Kamble et al. |
| 2012/0163319 | A1* | 6/2012 | Roessel ................ H04L 1/0003 370/329 |
| 2012/0184316 | A1 | 7/2012 | Ode |
| 2012/0213110 | A1 | 8/2012 | Yamaguchi |
| 2012/0281569 | A1 | 11/2012 | Yamamoto et al. |
| 2013/0064129 | A1 | 3/2013 | Koivisto et al. |
| 2013/0128834 | A1* | 5/2013 | Higuchi ............ H03M 13/2957 370/329 |
| 2013/0176852 | A1* | 7/2013 | Lumezanu ............ H04L 47/41 370/235 |
| 2013/0176952 | A1* | 7/2013 | Shin ..................... H04L 5/001 370/329 |
| 2013/0188492 | A1 | 7/2013 | Gorgen et al. |
| 2013/0190027 | A1 | 7/2013 | Cao et al. |
| 2013/0229972 | A1 | 9/2013 | Lee et al. |
| 2013/0242771 | A1 | 9/2013 | Ohta et al. |
| 2013/0242823 | A1 | 9/2013 | Lin et al. |
| 2013/0272251 | A1* | 10/2013 | Schmidt ................ H04W 72/12 370/329 |
| 2014/0098663 | A1 | 4/2014 | Vos et al. |
| 2014/0098781 | A1* | 4/2014 | Vos et al. .................... 370/330 |
| 2014/0153216 | A1 | 6/2014 | Yamanaka et al. |
| 2014/0198726 | A1 | 7/2014 | Xu et al. |
| 2014/0307697 | A1 | 10/2014 | Beale |
| 2014/0334372 | A1 | 11/2014 | Vos |
| 2014/0369223 | A1 | 12/2014 | Takeda et al. |
| 2015/0117352 | A1 | 4/2015 | Nammi |
| 2015/0195094 | A1 | 7/2015 | Yu et al. |
| 2015/0222407 | A1 | 8/2015 | Nammi et al. |
| 2016/0278098 | A1 | 9/2016 | Vos et al. |

FOREIGN PATENT DOCUMENTS

| | | |
|---|---|---|
| CN | 101517929 A | 8/2009 |
| CN | 101567714 A | 10/2009 |
| CN | 101785220 A | 7/2010 |
| EP | 2485552 A1 | 8/2012 |
| EP | 13843701.7 | 8/2012 |
| EP | 2259452 | 9/2013 |
| EP | 2995116 | 11/2014 |
| EP | 13843386.7 | 8/2015 |
| WO | 2003058907 A1 | 7/2003 |
| WO | WO 2011100479 A1 | 8/2011 |
| WO | 2013027522 | 2/2013 |
| WO | 2014053065 A1 | 4/2014 |
| WO | 2014053067 A1 | 4/2014 |
| WO | 2014055878 | 4/2014 |
| WO | 2014/179874 A1 | 11/2014 |

OTHER PUBLICATIONS

3rd Generation Partnership Project; Technical Specification Group Radio Access Network; Study on provision of low-cost MTC UEs based on LTE; (Release 11)3GPP TR 36.888, 3rd Generation Partnership Project, www.3gpp.org, 2011.

3rd Generation Partnership Project; Technical Specification Group Services and System Aspects; Study on Facilitating Machine to Machine Communication in 3GPP Systems; (Release 8), 3rd Generation Partnership Project, 3GPP TR 22.868 V8.0.0, Mar. 2007.

Office Action dated Jun. 18, 2015 for US20140098663 (U.S. Appl. No. 14/046,265).

LTE TDD Technology Overview by Maria Djanatliev http://www.slideshare.net/GoingLTE/lte-tdd-technology-overview, Published on Dec. 2, 2009.

3GPP document: TS 36.211 "Evolved Universal Terrestrial Radio Access (E-UTRA); Physical channels and modulation" Release 11, 2012.

LTE—The UMTS Long Term Evolution: From Theory to Practice, 2nd Edition, Stefania Sesia, Issam Toufik Matthew Baker, Published by Wiley, 792 pages, Aug. 2011, ISBN: 978-0-470-66025-6 (pp. 194 and 195).

International Search Report and Written Opinion dated Dec. 27, 2013, for related International Application No. PCT/CA2013/050752.

International Search Report and Written Opinion dated Dec. 5, 2013, for related International Application No. PCT/CA2013/050750.

Beale, M., "Future challenges in efficiently supporting M2M in the LTE standards," 2012 IEEE Wireless Communications and Networking Conference Workshop, Apr. 2012.

3GPP TS 36.331, Version 11.3.0, "3rd Generation Partnership Project; Technical Specification Group Radio Access Network; Evolved Universal Terrestrial Radio Access (E-UTRA); Radio Resource Control (RRC); Protocol specification (Release 11)," Mar. 2013.

3GPP TS 36.306 "Technical Specification; 3rd Generation Partnership Project; Technical Specification Group Radio Access Network; Evolved Universal Terrestrial Radio Access (E-UTRA); User Equipment (UE) radio access capabilities," Release 11, V11.3.0, Mar. 2013.

(56) References Cited

OTHER PUBLICATIONS

"All about SIB's in LTE," http://lteinwireless.blogspot.ca/2011/06/all-about-sibs-in-lte.html.
International Search Report and Written Opinion dated Jul. 16, 2014, for related International Application No. PCT/CA2014/050397.
Office Action for U.S. Appl. No. 14/046,265 dated Dec. 3, 2015.
Office Action for U.S. Appl. No. 14/262,433 dated Feb. 2, 2016.
Extended European Search Report for European Application No. 13843386.7 dated Apr. 11, 2016.
Extended European Search Report for European Application No. 13843701.7 dated Apr. 1, 2016.
IPWireless Inc., Backwards compatible support for reduced bandwidth LTE UEs, 2012.
Sierra Wireless, PUSCH coverage improvement through limiting the number of sub-carriers per resource block, 3 GPP: R1-125083, 2012.
Sierra Wireless, Test proposal for MTC coverage improvement through limiting the number of sub-carrier per resource block, 3GPP: R1-130064, 2013.
Martin Beale, "Future Challenges in Efficiently Supporting M2M in the LTE Standards", Wireless Communications and Networking Conference Workshops (WCNCW), 2012 IEEE (Abstract Only).
Office Action (with Search Report), dated Oct. 23, 2017, for Chinese Application No. 201380063488.6.
Huawei et al, "Coverage Enhancement for Physical Channels and Signals for Low-cost MTC", Jan. 28-Feb. 1, 2013, 3GPP Draft; R1-130017, 3rd Generation Partnership Project (3GPP), Mobile Competence Centre; 650, Route Des Lucioles; F-06921, Sophia-Antipolis Cedex; France.
Samsung, "(E) PDCCH Coverage Enhancements for Low-Cost MTC UEs", Apr. 2013, 3GPP Draft; R1-13107 (E) PDCCH Coverage Enhancements for MTC, 3rd Generation Partnership Project (3GPP), Mobile Competence Centre; 650, Route Des Lucioles; F-06921 Sophia-Antipolis Cedex; France.
Huawei et al, "Coverage Analysis on (E) PDCCH and PUCCH for low-cost MTC UEs" Apr. 2013, 3GPP Draft; R1-130889, 3rd Generation Partnership project (3GPP), Mobile Competence Centre; 650, Route Des Lucioles; F-06921 Sophia-Antipolis Cedex; France.
Sierra Wireless, "Restrictive Scheduling for SIBs for MTC coverage Improvement", May 2013, 3GPP Draft; R1-131867 Restrictive Scheduling SIB Decoding Clean, 3rd Generation Partnership Project (3GPP), Mobile Competence Center; 650, Route Des Lucioles; F-06921 Sophia-Antipolis Cedex; France.
LTE, "SIB Coverage Improvement", Nov. 2013, 3GPP Draft; R1-135358 SIB, 3rd Generation Partnership Project (3GPP), Mobile Competence Centre; 650, Route Des Lucioles; F-06921 Sophia-Antipolis Cedex; France.
Extended European Search Report Issued by European Patent Office for European Patent Application No. 14794497.9 dated Nov. 18, 2016.
Chinese Office Action dated Feb. 26, 2018, for Chinese Patent Application No. 201380063461.7, 22 pages (with English translation).
Chinese Office Action dated Aug. 3, 2018, for Chinese Patent Application No. 201380063488.6, 18 pages (with English translation).
European Communication Pursuant to Article 94(3) EPC dated Mar. 15, 2018, for EP Application No. 14 794 497.9, 6 pages.
European Communication Pursuant to Article 94(3) EPC dated Jun. 18, 2018, for EP Application No. 13 843 701.7, 5 pages.
Non-Final Office Action dated Jan. 26, 2018, for U.S. Appl. No. 15/171,550, filed Jun. 2, 2016, 21 pages.
Notice of Allowance dated Feb. 9, 2018, for U.S. Appl. No. 14/262,433, filed Apr. 25, 2014, 12 pages.
3GPP TSG RAN WG1 #52bis R1-031240, LG Electronics, Mar. 31-Apr. 4, 2008.
Decision of Rejection dated Feb. 26, 2019, for corresponding Chinese Patent Application No. 201380063488.6, 18 total pages (with English translation).
Intention to Grant dated Nov. 21, 2018, for corresponding EP Application No. 13843386.7, 5 total pages.
Intention to Grant dated Apr. 5, 2019, for corresponding EP Application No. 13843701.7, 5 total pages.
Office Action dated Dec. 5, 2018, for corresponding Chinese Patent Application No. 201380063461.7, 18 total pages (with English translation).
Office Action dated Sep. 7, 2018, for corresponding U.S. Appl. No. 15/171,550, 37 total pages.
Office Action dated May 7, 2019, for Corresponding U.S. Appl. No. 15/171,550, 27 total pages.
Beale, M., "Future challenges in efficiently supporting M2M in the LTE Standards", 2012 IEEE Wireless Communications and Networking Conference Workshop (WCNC Workshop on Internet of Things Enabling Technologies, Embracing Machine-to-Machine Communications and Beyond), pp. 186-190, Apr. 1, 2012 (Abstract).
International Search Report for International Application No. PCT/CA2013/050750, dated Dec. 5, 2013.

\* cited by examiner

METHOD, APPARATUS AND SYSTEM FOR UPLINK RADIO RESOURCE ALLOCATION IN AN LTE COMMUNICATION SYSTEM

CROSS-REFERENCE TO RELATED APPLICATIONS

This application claims the benefit and priority of U.S. Provisional Application 61/710,466, filed Oct. 5, 2012. The foregoing application is incorporated by reference herein in its entirety.

FIELD OF THE TECHNOLOGY

The present technology pertains in general to radio communication and in particular to allocation of radio frequencies for use in communicating with Machine-to-Machine (M2M) devices via a communication standard such as the Long-Term Evolution (LTE) standard.

BACKGROUND

The latest generation cellular radio standard known as LTE (Long Term Evolution) has been designed to provide high data rate capacity and good spectral efficiency in terms of bits per second per Hz. This serves the needs of smartphones, tablet and laptop computers that offer high data capacity using applications such as video streaming. M2M (Machine to Machine) applications of cellular radio in many cases require only a modest amount of data capacity. In many cases communication is short and intermittent and the "mobile" M2M device may not move, or may have limited mobility and low speed. This is a significantly different use case from the uses that drove the LTE specification and which currently drive the chip designs for LTE.

M2M is set for very significant growth in the next few years. The total number of M2M connected devices may exceed the current numbers of phones, smartphones and other data communication devices. It is currently popular in the M2M modems market to use the older GSM/GPRS networks that have lower data rates, relative simplicity and lower cost. Unfortunately, this cannot be a long term solution as smartphones are migrating to the new 3G and LTE technologies. It is expected that the service providers will not want to maintain the older base stations. Also, with an ongoing shortage of available bandwidth for new services the service providers may want to migrate their spectrum allocations from GSM/GPRS to the newer systems that have higher capacity in a given bandwidth. This means that eventually GSM/GPRS will no longer be supported.

The 3GPP (Third Generation Partnership Project) standards committees have recognized the need for LTE to support very large numbers of M2M UEs (User Equipment) and have identified objectives for modifications to the existing LTE standards designed to support very large numbers of M2M UEs. A particular requirement of proposed changes to the existing standards is to ensure ongoing compatibility with existing devices and to minimize the impact of M2M traffic on the high data rate and low latency requirements of current and future users.

The standards groups have identified specific features and requirements for facilitating coexistence of large numbers of M2M UEs with each other and with other classes of UEs on the LTE system. There is also an objective to make it possible to have simpler and lower cost modems for M2M UEs that may not take advantage of advanced LTE features. For example LTE offers MIMO for higher capacity and more reliable communication. M2M UEs may be cost reduced by not using this feature, which requires multiple radios operating simultaneously.

Some ideas on the subject of M2M specialization within the LTE standard are captured in the draft specification entitled "3rd Generation Partnership Project; Technical Specification Group Radio Access Network; Study on provision of low-cost MTC UEs based on LTE; (Release 11) 3GPP TR 36.888," $3^{rd}$ Generation Partnership Project, www.3gpp.org, referred to herein as TR 36.888.

One strategy is to reduce the bandwidth of communication in the downlink (base station to UP) from 20 MHz down to as little as 1.4 MHz. This serves to reduce the cost of the components needed in the UE receiver and may be used to improve signal to noise and interference ratio of the received signal due to the narrower required bandwidth, TR 36.888 describes using a dedicated 1.4 MHz block of frequencies in the current 20 MHz band, possibly in the center of the 20 MHz.

Device coverage is an ongoing concern for wireless devices, including M2M devices and LTE network devices. Coverage may, for example, be adversely impacted by M2M specialization initiatives.

Therefore there is a need for a method, apparatus and system for radio resource allocation that is not subject to one or more limitations of the prior art.

This background information is provided for the purpose of making known information believed by the applicant to be of possible relevance to the present technology. No admission is necessarily intended, nor should be construed, that any of the preceding information constitutes prior art against the present technology.

SUMMARY OF THE TECHNOLOGY

An object of the present technology is to provide a method, apparatus and system for uplink radio resource allocation in an LTE communication system. In accordance with an aspect of the present technology, there is provided a computer-implemented method for facilitating uplink communication from a user equipment (UE) to a base station in an LTE communication system, the method comprising: selecting one or more frequency subcarriers within an LTE resource block, the selected one or more frequency subcarriers covering less than the entire frequency range of the LTE resource block; and using the selected one or more frequency subcarriers for communication from the UE to the base station.

In accordance with another aspect of the present technology, there is provided a computer-implemented method for facilitating uplink communication from two or more user equipments (UEs) to a base station in an LTE communication system, the computer-implemented method comprising implementing a further computer-implemented method at each of the two or more UEs, wherein each of the two or more UEs uses a non-overlapping set of frequency subcarriers for communication, the further computer-implemented method comprising: selecting one or more frequency subcarriers within an LTE resource block, the selected one or more frequency subcarriers covering less than the entire frequency range of the LTE resource block; and using the selected one or more frequency subcarriers for communication from the UE to the base station.

In accordance with another aspect of the present technology, there is provided a LTE wireless communication system comprising a base station and one or more user equipments (UEs) configured for performing uplink communication to the base station; wherein the base station comprises a subcarrier selection module, the subcarrier selection module configured to select one or more frequency subcarriers within an LTE resource block for use by a designated UE, the selected one or more frequency subcarriers covering less than the entire frequency range of the LTE resource block; wherein the base station is configured to transmit a subcarrier selection message to the designated UE, the subcarrier selection message indicative of the selected one or more frequency subcarriers; wherein the UE comprises a subcarrier selection message processing module configured to receive and process the subcarrier selection message; and wherein the UE further comprises a communication module configured to use the selected one or more frequency subcarriers for communication from the UE to the base station.

BRIEF DESCRIPTION OF THE FIGURES

These and other features of the technology will become more apparent in the following detailed description in which reference is made to the appended drawings.

DETAILED DESCRIPTION OF THE TECHNOLOGY

Definitions

Figure 1:
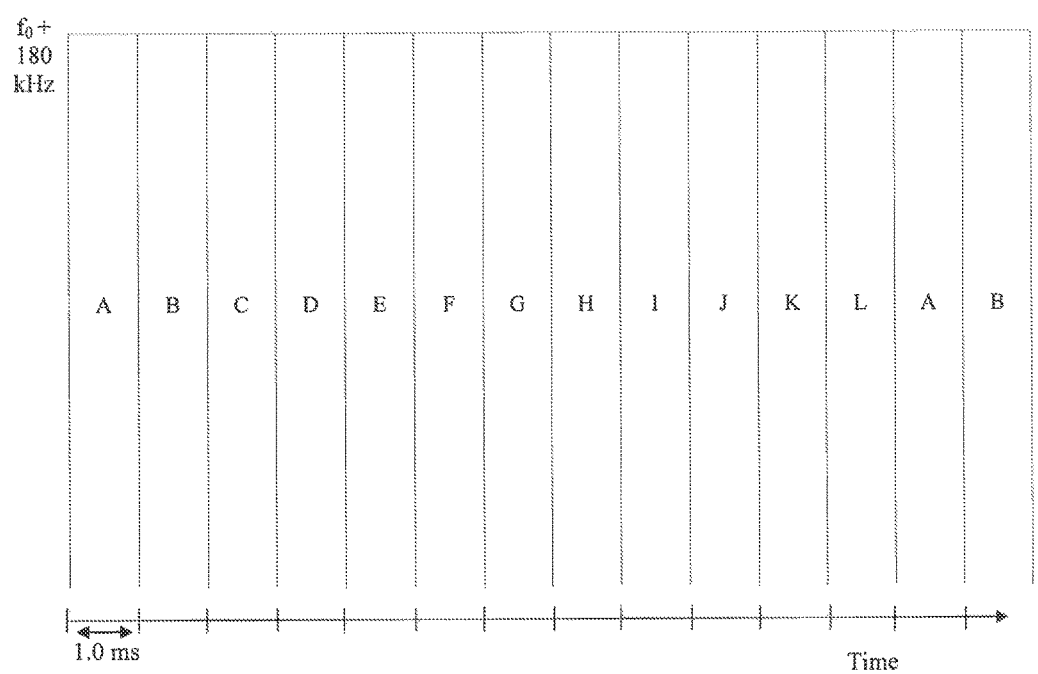
FIG. 1 illustrates an example allocation of uplink resources in accordance with the current LTE standard.

As used herein, a machine-to-machine (M2M) terminal or user equipment refers to a wireless communication terminal linked to an automated device, such as a smart meter, environmental monitor, medical patient monitor, traffic monitoring and/or control device, or other automated equipment. M2M terminals are typically distinguished from human-to-human terminals, and are typically subjected to different communication demands. An M2M terminal may also be known as a machine-type-communication (MTC) terminal. An example study on M2M communications is presented in "3rd Generation Partnership Project; Technical Specification Group Services and System Aspects; Study on Facilitating Machine to Machine Communication in 3GPP Systems; (Release 8)," $3^{rd}$ Generation Partnership Project, 3GPP TR 22.868 V8.0.0, March, 2007.

As used herein, the term "about" refers to a +/−10% variation from the nominal value. It is to be understood that such a variation is always included in a given value provided herein, whether or not it is specifically referred to.

The current LTE standard specifies at least the following terms. A slot corresponds to a 0.5 ms time interval. A sub-frame corresponds to a 1 ms time interval of two consecutive slots. A half frame corresponds to 5 sub-frames and a frame corresponds to 10 sub-frames. A transmit time interval (TTI) also corresponds to a 1 ms time interval. In some embodiments, scheduling decisions may be modified every 1 TTI. A resource block corresponds to 12 subcarriers times 1 slot. Each subcarrier is spaced apart by 15 kHz. A resource block thus spans 180 kHz (12 subcarriers times 15 kHz per subcarrier) and 0.5 ms. The system bandwidth is adjustable between about 1.4 MHz and 20 MHz. Embodiments of the present technology are compatible with the above terms and values. However, it is recognized that the present technology may also be applicable if the terminology and values are adjusted, for example due to further revisions of the LTE standard. It is also recognized that the present technology may be applicable to other substantially similar standards, whether derived from the LTE standard or developed independently.

Unless defined otherwise, all technical and scientific terms used herein have the same meaning as commonly understood by one of ordinary skill in the art to which this technology belongs.

Embodiments of the present technology provide a computer-implemented method for facilitating uplink communication from a user equipment (UE) to a base station in an LTE communication system. The method comprises selecting one or more frequency subcarriers within a predetermined LTE resource block. The selected one or more frequency subcarriers cover less than the entire frequency range of the LTE resource block. For example, each subcarrier may cover 15 kHz of a 180 kHz resource block frequency range. In some embodiments, a single such subcarrier may be selected. The method further comprises using the selected one or more frequency subcarriers for communication from the UE to the base station.

Embodiments of the present technology provide a system comprising a base station (eNodeB) and a user equipment (UE), such as a M2M UE. The UE is configured for performing uplink communication to the base station in a LTE communication system. The base station (or more generally, the system) comprises a subcarrier selection module configured to select one or more frequency subcarriers within a predetermined LTE resource block. The selected one or more frequency subcarriers cover less than the entire frequency range of the LTE resource block. The UE further comprises a communication module configured to use only the selected one or more frequency subcarriers for communication from the UE to the base station. Other subcarriers within the resource block remain unused by the UE, although they may be used by other UEs.

The subcarrier selection module may be configured to select subcarriers for each of a plurality of UEs in a coordinated fashion, and to transmit subcarrier selection messages to each UE indicative of which subcarriers to use. Subcarriers for each of the plurality of UEs may be selected for example in order that different UEs avoid using the same subcarrier at the same time. The UE may further comprise a subcarrier selection message processing module configured to receive these subcarrier selection messages and direct usage of the selected subcarriers by the UE accordingly.

The current LTE standard specifies that an individual UE may transmit in twelve 15 kHz subcarriers across a 180 kHz band in a 0.5 ms time slot. That is, a UE may be assigned an integer number of resource blocks, and is expected to make use of at least one resource block. The minimum Transmit Time Interval for any transmitter is 1 ms and that encompasses two adjacent resource blocks. To reduce the peak to average power radio (PAPR), the resource block is sent using SC-FDMA (i.e. the resource block is DFT spread). The frequency diversity offers some immunity from frequency selective multipath propagation nulls. One or more of the resource blocks or subcarriers thereof may be lost but the others will be received. However, with low data rate requirements of some M2M devices, it is recognized that a full resource block may not be necessary to provide adequate data carrying capacity.

FIG. 1 illustrates an example allocation of uplink resources in accordance with the current LTE standard. Each of 12 UE's, labelled A through L, use a single resource block in its entirety. As illustrated, sequential resource blocks are allocated to different UE's. A resource block corresponds to use of a 180 kHz frequency band for at least one time slot. The 180 kHz frequency band is divided into twelve 15 kHz subcarriers, each subcarrier corresponding to a given subcarrier (subcarrier spacing is 15 kHz as specified in the LTE standard). In various embodiments, fewer than the full number of 12 subcarriers may be used by a UE in each slot or TTI.

In accordance with embodiments of the present technology, an M2M UE is configured to transmit on the uplink using only one of the 15 kHz subcarriers selected from the twelve subcarriers within a 180 kHz LTE resource block. Transmission may be constrained in the time domain by TTIs, for example so that each transmission lasts for about 1.0 ms. A TTI is a standard minimum allocation and encompasses two successive slots. M2M UEs thus use fewer network resources in the frequency domain, thereby lessening the impact of each M2M UE and potentially allowing for the presence of more M2M UEs within the system. Since only a single subcarrier is used, the M2M UE's may be regarded as essentially using OFDMA in the uplink direction. In these embodiments, the uplink peak to average power ratio (PAPR) may be lower because only one tone is being sent (i.e. one subcarrier is being used). Thus, a primary concern which motivated the use of SC-FDMA is substantially alleviated, Embodiments of the present technology trade speed (and to a lesser extent latency) for improved coverage. In one embodiment, it is expected that the uplink speed should still be able to support (6 bit/sym×15 ksym/sec×0.75 coding=6*15*0.75) 67.5 kbps, which is comparable to the uplink speed for GPRS. It is also expected that the uplink link budget should improve by about a factor of 12 (10.8 dB), since all of the PA's power is concentrated into a narrow band, thereby increasing the power spectral density.

The above increased power spectral density is not expected to be problematic from a regulatory standpoint, because regulated power limits are defined for bandwidths that are much larger than 15 kHz. Other concerns due to the higher power spectral density (PSD) are that the higher PSD of M2M terminals transmitting from the cell edge will interfere with adjacent cells to a greater extent than they currently do. The current LTE standard already has provision for co-ordination of adjacent cells to deal with this issue. One cell allows UEs to transmit at high PSD while an adjacent one only uplinks from UEs closer to it. Alternatively time may be allocated to first one cell then the other. It is expected that having the UEs transmit individual subcarriers at higher PSD may require some additional adjustments in order to maintain the required interference margins.

Yet another concern is that the Adjacent Channel Leakage Ratio ACLR may be higher in proportion to the increased PSD of the single sub-channel unless UEs that use this method of transmission are specified with better spectral purity than currently required. Since UEs transmitting with this higher power may be in positions with high path loss from the eNodeB the ACLR they should appear balanced in power at the eNodeB receiver and therefore the high ACLR may not be problematic. One potentially problematic case is where the LTE system band allocation is next to another service provider's spectrum allocation. In this case it may be necessary to avoid assigning resources where high PSD subcarriers are used, near the band edge in order to avoid interference due to ACLR into the adjacent carrier's spectrum. Making the ACLR lower in the UE may require it to have higher cost and to have higher power consumption.

In some embodiments, if higher UE transmitter power is concentrated on one frequency, this may potentially generate higher adjacent channel interference power. Such transmissions may be managed on a system level to avoid interference to adjacent frequency allocations, particularly those frequency allocations not using the same format.

In various embodiments, some cost and/or complexity savings may be obtained by realizing a lower maximum power amplifier (PA) power in cases where the path loss is low enough to allow it. A PA having a controllable power level may be incorporated into each UE and controlled in accordance with embodiments of the present technology. In general some lower uplink processing and digital-to-analog converter (D/A) requirements may also be realizable due to the reduced uplink speed.

Embodiments of the present technology facilitate a refinement in the uplink resources being allocated for use by various UE's. Rather than the smallest allocatable resource unit being an LTE resource block, the present technology allows for a smaller allocatable resource unit of one subcarrier over one TTI or even one slot. Increased compatibility with existing portions of the LTE standard may be achieved when the minimum time allocated is one TTI. This may be advantageously used when UE's do not require the full bandwidth available in a resource block, for example in the case of M2M UE's which transmit limited data. A larger number of such UE's may be accommodated within the LTE system, typically alongside other classes of user equipment. For example, in some embodiments, one UE uses just one subcarrier frequency band in a resource block, and the other 11 subcarrier frequency bands in the resource block are potentially used by one or more other UEs to maximise compatible sharing of resources by M2M and non-M2M UEs. In some embodiments, a plurality of UEs can share a resource block in this manner, with each UE being assigned a certain subset of one or more of the 12 subcarriers in the resource block.

Embodiments of the present technology may be incorporated into existing LTE systems, which concurrently support legacy LTE operations. In some embodiments, a subset of the resource blocks allocated for uplink usage in an LTE system may be further allocated for sharing between UEs as described herein. Other resource blocks may be used in accordance with legacy operation, for example with each of said other resource blocks allocated to a single UE.

In accordance with legacy resource assignment methods within LTE, uplink grants to UEs may be sent out from the eNB in the PDCCH channels in the Downlink Control Information (DCI). DCI Formats 0 and 4 are defined for uplink grants, with Format 0 used for single transmitters and Format 4 used for MIMO. Both formats are padded to match other, mainly downlink, allocation formats. In various embodiments, these and/or other legacy resource assignment messages may be adapted for use in the present technology.

For example, additional information related to allocating resource grants at the sub-Resource Blocks may be added to the definitions for legacy Formats 0 and 4. In some embodiments this is done potentially without adding more signalling overhead to the system.

Figure 6:
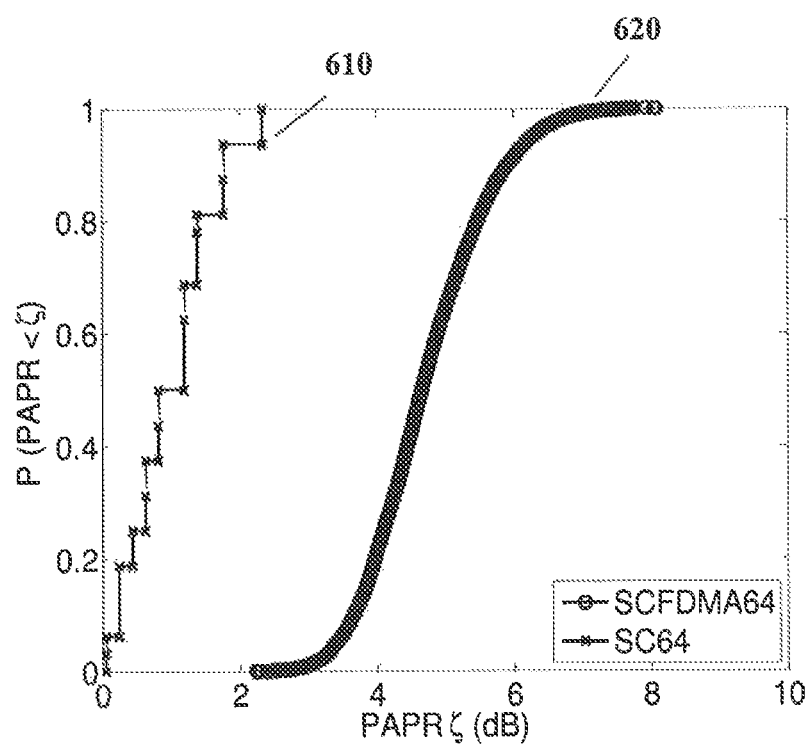
FIG. 6 illustrates a comparison of peak to average power ratio (PAPR) between an embodiment of the technology and the prior art.

Various embodiments of the present technology may facilitate further reduction in PAPR relative to SC-FDMA, since the transmission at each time instance occurs only over one carrier. FIG. 6 illustrates a comparison of PAPR for an embodiment of the present technology 610 relative to SC-FDMA 620. The embodiment of the present technology and the SC-FDMA scheme both operate using 64QAM.

It is noted that, in various embodiments, multiple (e.g. 12) different UEs will be transmitting via shared resources during a time interval where, in the prior art, only one UE would be transmitting. Potentially this may require an increase in DCI messaging for communicating resource grants for multiple (e.g. 12) different UEs in the time when normally only one UE would receive a resource grant. Alternatively, in some embodiments, to counteract this potential increase in DCI messaging, the multiple (e.g. 12) UEs may be configured to perform frequency hopping in a common pattern, but with the starting times of the UEs staggered or with each UE starting at a different location within the pattern. The common pattern may be known a priori or communicated in common or dedicated messages. The pattern may be such that each frequency is visited exactly once during each repeat of the pattern, thereby avoiding collision between UEs which start at different locations within the pattern sequence.

In accordance with embodiments of the present technology, the information normally (i.e. in accordance with existing LTE standards) transmitted by a single UE in a TTI consisting of two adjacent resource blocks each of one slot and twelve subcarriers may be spread over 12 TTIs. In some embodiments, 12 consecutive 1.0 ms TTIs may be used to transmit information from the UE. In some embodiments, one 1.0 ms TTI in each of 12 consecutive sub-frames may be used to transmit information from the UE, for example interleaved with other communications.

In various embodiments, maintaining the TBS (transmit block size—used by higher layers in the LTE protocol) at the same size as in existing LTE implementations and/or keeping the TBS constant during operation may lessen the protocol changes required and may further add little or no additional overhead to resource assignment operations. The TBS may be the same whether a single subcarrier over 12 TTIs is assigned or 12 subcarriers in the one TTI (current standard) is assigned. In some embodiments, to avoid loss of coding gain, the amount of data in a TBS may be kept above a minimum threshold. The data in TTIs may be grouped over time to form an effective TBS size. This approach may result in increased latency; however this may not be an issue for various classes of M2M UEs.

In embodiments where single subcarriers are used by a UE over 12 successive TTIs instead of 12 subcarriers in the same TTI once every 12 TTIs, the amount of data communicated over a period of time will be the same. The potential to share resources with up to 11 other similarly configured UEs may also be the same and the throughput of data for each of the other 11 may also be the same. A similar situation applies when a plurality of UEs share the 12 subcarriers with at least some UEs using two or more subcarriers at once.

In order to avoid the possibility of always transmitting on a less effective frequency (for example a 15 kHz frequency subcarrier that is experiencing persistent frequency selective fading), embodiments of the present technology are configured so that a UE uses a different subcarrier for each slot. For example, frequencies may vary according to a pseudo-random sequence. This approach may improve the frequency diversity advantage. In some embodiments, other schemes involving longer frequency steps outside the current resource block may be used for improved frequency selective fading immunity.

The LTE system currently allows for resource blocks to be assigned in two ways on the downlink. Localised data mapping means that adjacent (in time) resource blocks on a given frequency are used for a TTI for a UE. Distributed data mapping means that those two RBs are on different frequencies. In some embodiments of the present technology, the distributed data mapping concept may be extended to resource assignments for the uplink and for individual or groups of resource elements within a Resource Block (RB). Scheduling may be more complex in this case.

In some embodiments, in order to achieve such scheduling, group signalling may be performed for signalling all of the UEs that would be sharing Resource Elements (REs) within a Resource Block (RB). All of these UEs may be configured, in response to such signalling, to jump to a different RB frequency allocation as a group, holding their relative RE positions within the RB constant. This jump may be assigned to the group with a signalling mechanism similar to downlink distributed data mapping for a single UE. Greater frequency steps may be provided to give improved frequency diversity than just hopping the relative positions within one RB of 180 kHz. Other, potentially more complicated frequency allocations are possible, such as swapping the RE positions and jumping to different RB frequencies, possibly at the expense of more signalling overhead. More complicated schemes may be performed subject to trade-offs between improved frequency diversity and the loss of capacity from the additional individual signalling required for all the participating UEs. Distributed data mapping is illustrated for example in FIG. 9.3 on Page 195 of LTE The UMTS Long Term Evolution, 2nd Edition edited by Stefania Sesia.

In accordance with embodiments of the present technology, different UEs may be configured to transmit on different 15 kHz subcarriers within the same resource block, substantially concurrently with each other. Transmissions of different UEs may be arranged in a pattern to avoid collisions.

In some embodiments, if alt the subcarriers are assigned within the resource block, there may be no net loss of system resources or system efficiency (i.e. the aggregate amount of data sent may be the same). To ensure that all the subcarriers are assigned, the scheduler may be configured to assign the remaining subcarriers to other UEs even if those UEs do not require additional coverage as there is no loss in performance for those "fill-in" UEs except possibly latency. Although the scheduler may use substantially any available UE to fill in the remaining subcarriers, it is beneficial for the scheduler to choose UEs with lower latency requirements and those UEs in a similar coverage area (low coverage in this situation). Choosing "fill-in" UE's in low coverage is beneficial because the strong co-channel interferers to other BTS can be aggregated together in time as described in above. In some embodiments, unused subcarriers may be used to facilitate additional channel coding, for example by allocating these subcarriers to UEs in order to transmit additional redundant copies of prior or future data transmissions, or suitably encoded portions of such data transmissions, checksums, or the like.

In embodiments, subcarrier selection is managed so that different UEs utilize different subcarriers within a resource block. This may be facilitated for example by devising an appropriate subcarrier usage schedule at the base station and forwarding this for use by the different UEs. Subcarrier selection messages indicative of such usage schedules may be transmitted from the base station to the UEs in real time, in advance, or a combination thereof. Resource reservation schemes may also be employed. Subcarrier usage patterns at each UE may be repeated over time. To reduce complexity, the pattern repetition rate may be increased.

In some embodiments, a subcarrier selection message may indicate the usage schedule over a certain time period. For example, the selection message may provide a UE with a schedule of which subcarriers to use for the next 12 TTIs, or for about the next 100 TTIs, 1000 TTIs, or another length of time. In some embodiments, the selection message may indicate to a UE that a predetermined pattern for subcarrier selection should be executed by the UE repeatedly, for example repeatedly a predetermined number of times, repeatedly for a predetermined time period, repeatedly indefinitely until a further message is received, or the like. In some embodiments, if a UE is allocated plural subcarriers for concurrent use, the subcarrier selection message may indicate the usage schedule for the plural subcarriers, or plural subcarrier selection messages may be transmitted, each indicating the usage schedule for a subset of the plural subcarriers. For example, each of a plurality of subcarrier selection messages may indicate the usage schedule for one subcarrier, and the UE may receive multiple such messages enabling it to concurrently use plural subcarriers.

In some embodiments, the data is spread in time across 12 different (for example consecutive) resource blocks rather than transmitted in parallel. For example, other layers of the LTE protocol may receive the same block of data as would normally be received in one block from one UE in 1.0 ms but after 12 ms of transmission. As another example, other layers of the LTE protocol may receive the same block of data as would normally be received from one UE in 1 ms but after 12 ms of transmission. In other embodiments, transmissions from a UE may be spread over non-consecutive resource blocks.

As another example, if twelve UEs shared the frequencies of a single resource block over 12 ms (i.e. 12 transmit time intervals or TTIs) then the total data received by the eNodeB would be the same as from twelve UEs each using 1 resource block for 1 ms.

Optionally, as already mentioned above, a M2M UE may use more than one 15 kHz subcarrier within a resource block. Thus, for example, a UE may use two, three or possibly even more subcarriers (e.g. six) within a single resource block. However, the number of subcarriers used may be limited in order to limit the PAPR. Using more subcarriers may also require lower transmitted power on each subcarrier to stay within equipment and regulated limits, which reduces the coverage extension advantage. In some embodiments, if the number of subcarriers assigned is greater than a pre-configured number where PAPR becomes a problem, the UE may DFT spread the subcarriers to reduce PAPR. The pre-configured number may be assigned to the UE by the system statically or dynamically with each resource allocation. Subcarriers generated by a UE that are not adjacent may be uniformly or non-uniformly spaced apart in order to allow for a desirable interleaving of carriers from other UEs and to take advantage of the benefits of frequency diversity. Subcarrier selection messages may be generated in view of the above. In some embodiments, use of multiple subcarriers may be used in situations where a corresponding power reduction of the individual tones can be accommodated in the link budget.

Figure 2:
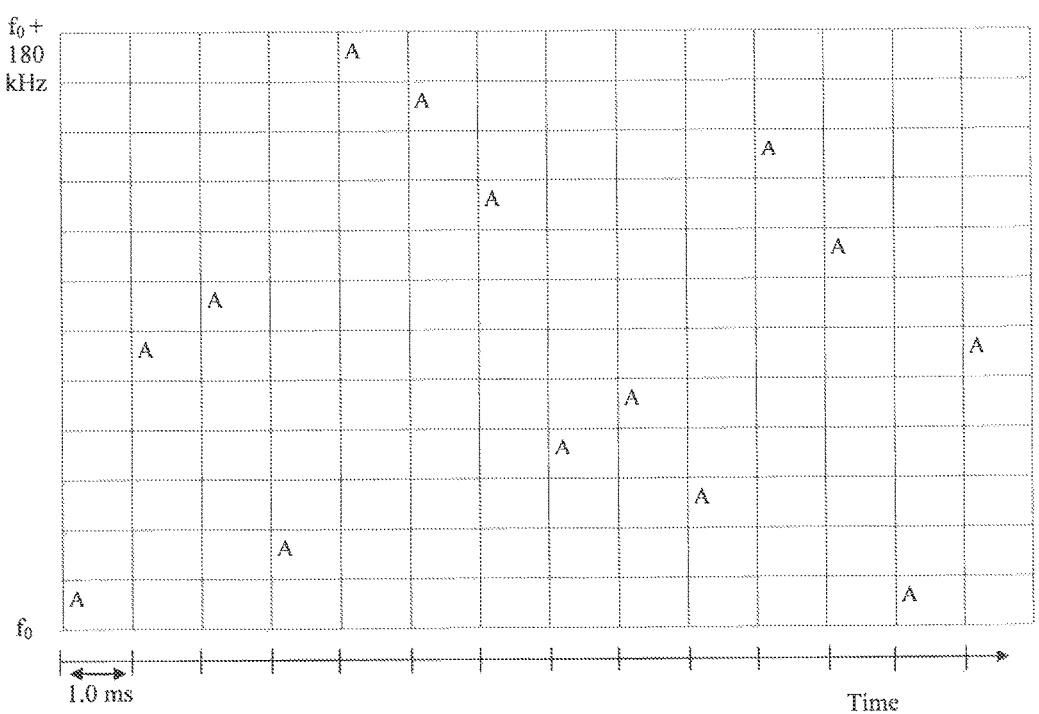
FIG. 2 illustrates the partial use of plural consecutive resource blocks by an M2M UE in accordance with an example embodiment of the present technology.
Figure 3:
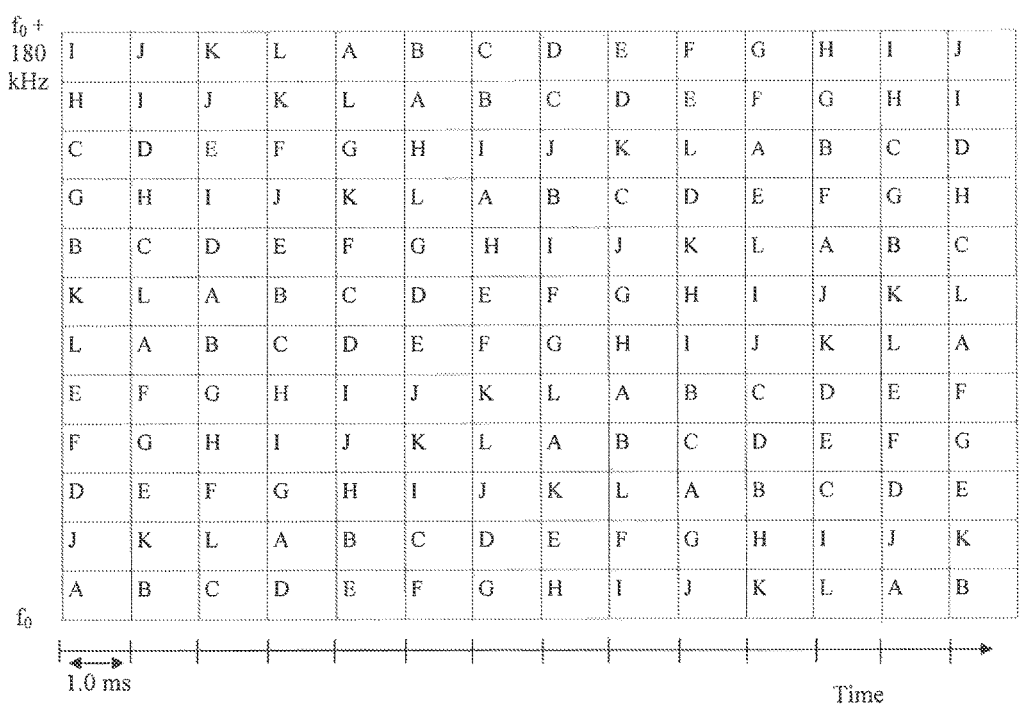
FIG. 3 illustrates the sharing of plural consecutive resource blocks by 12 different M2M UEs, in accordance with an example embodiment of the present technology.

FIG. 2 illustrates the partial use of plural consecutive resource blocks by an M2M UE in accordance with an example embodiment of the present technology. Again, each resource block corresponds to a 180 kHz band over 0.5 ms, with the 180 kHz band divided into 12 subcarriers. In this example, it is assumed that two resource blocks are used per 0.5 ms TTI. The M2M UE utilizes frequency hopping within the subcarriers. In the first 1 ms time interval, the M2M UE transmits using the lowermost (first) 15 kHz subcarrier. In the second 1 ms time interval, the M2M UE transmits using the $6^{th}$ 15 kHz subcarrier. This process continues for at least 12 ms, with the subcarrier being changed every 1 ms. FIG. 3 illustrates the sharing of plural consecutive resource blocks by 12 different M2M UEs, in accordance with an example embodiment of the present technology. Each M2M UE uses a single 15 kHz subcarrier in each 1 ms TTI, and changes subcarriers at the end of each 1 ms TTI. Each of the 12 M2M UEs uses a different 15 kHz subcarrier at a given time. Frequency hopping schedules may need to be coordinated between M2M UEs to avoid collisions. In the present example, this is accomplished by handing over each subcarrier to the next-labelled UE in sequence, so that, for example, a subcarrier used by UE A in TTI k is used by UE B in TTI k+1. Alternative schedules may also be used. For example, each UE may be initially assigned a unique subcarrier, and may then use the next higher frequency subcarrier during the next TTI. Various mathematical methods may be used to generate plural (N) subcarrier assignment sequences, such as pseudorandom sequences, under the constraint that the sequences are non-overlapping element wise, that is, over all sequences $S_n$ (for n=1 to N), the $k^{th}$ elements $S_n(k)$ of the sequences are pairwise different for all values of k, that is $S_n(k) \neq S_m(k)$ for all pairs m≠n.

The frequency-hopping pattern can be designed in different ways. For example, one way is to adapt the predefined hopping patterns between RBs using a Gold sequence in the current LTE standard, namely TR 36.211, Section 5.3.4, for hopping between frequencies in a 12-ms duration, by setting NULRB=12, and Nsb=1, 2, 3, 4 or 6. This design has the advantage of being standard-compatible.

Figure 2A:
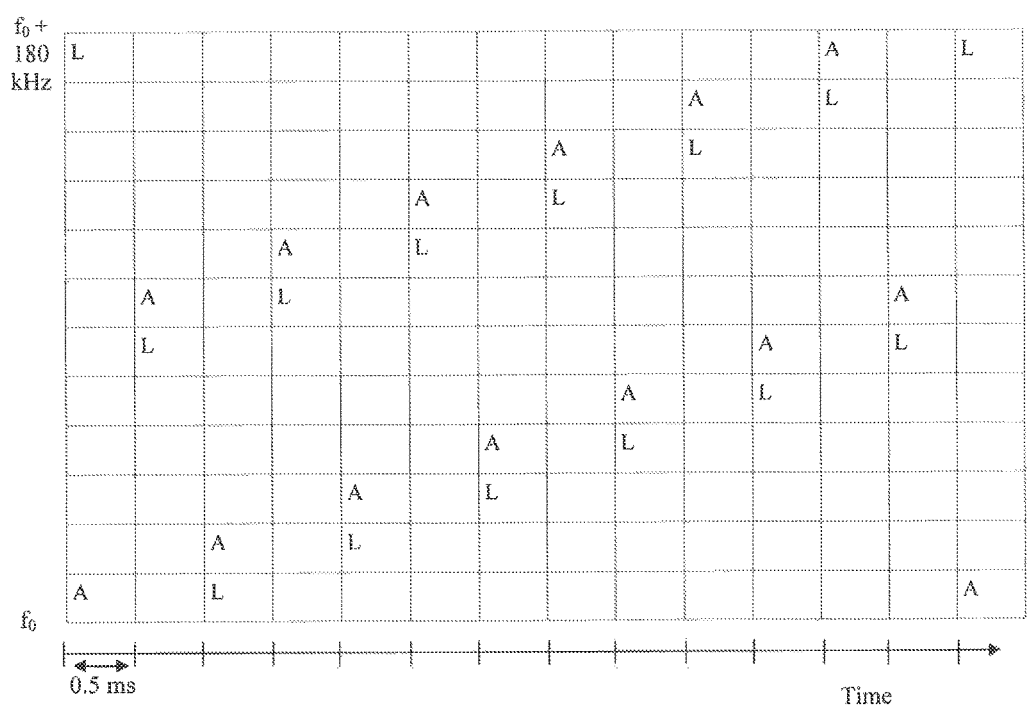
FIG. 2a illustrates frequency hopping performed on a per-slot basis, in accordance with embodiments of the technology.

In another example embodiment illustrated in FIG. 2a, an individual UE changes subcarriers once every slot (0.5 ms), e.g. twice every TTI. There may be an advantage to this because two adjacent slots are often processed together as a 1 ms TTI when performing error correction decoding. If transmission in one slot is via a frequency that is faded (i.e. exhibiting poor signal quality due to fading) and transmission of its partner in the same TTI is via a relatively unfaded frequency then the error correction may be able to correct the errors from the faded slot. This may lead to improved communication relative to transmitting in both slots via the same faded frequency which may leave errors even after error correction. The pattern illustrated in FIG. 2a may extend in a repeated manner. In some embodiments, the schemes illustrated in FIGS. 2 and 3 may be adapted to this more rapid sequence of changing frequencies, for example by doubling the rate at which subcarrier frequencies are changed. In some embodiments, adjacent slots may be made to have widely dispersed frequencies (for example such that each subcarrier frequency used by a UE differs from the previous subcarrier frequency used by that UE by at least a predetermined threshold) in order to better assure that there is consistently adequate frequency diversity and/or to better take advantage of the power of the combined error correction as described. This is anticipated to provide further improved performance. By increasing frequency diversity, for example by changing the frequency in relatively large increments, e.g. −6 or −5 subcarriers as illustrated in FIG. 2a, potential deep fades if adjacent frequencies have a correlated deep hiding pattern are reduced.

Figure 4:
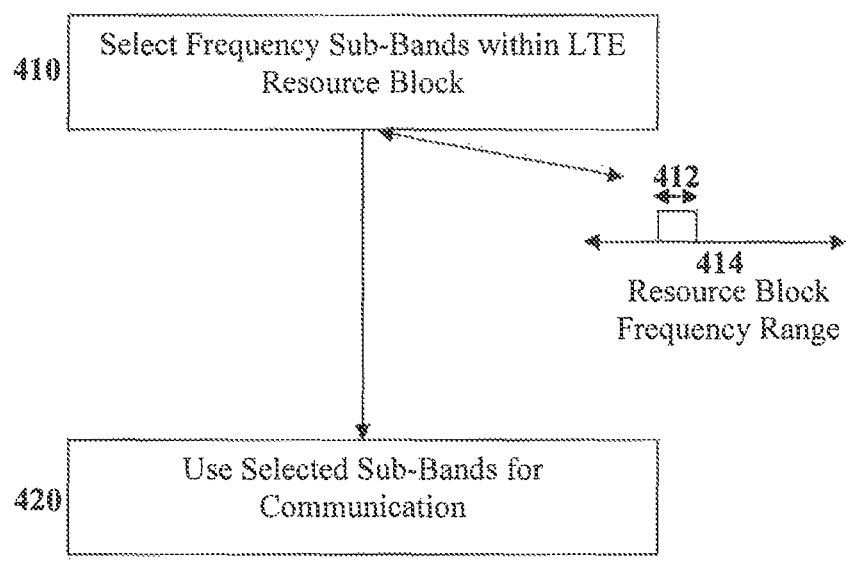
FIG. 4 illustrates a method for uplink radio resource allocation in an LTE communication system, in accordance with embodiments of the technology.

FIG. 4 illustrates a method for uplink radio resource allocation in an LTE communication system, in accordance with embodiments of the technology. The method comprises selecting 410 one or more frequency subcarriers 412 within a predetermined LTE resource block. The selected one or more frequency subcarriers cover less than the entire frequency range 414 of the LTE resource block. The method further comprises using 420 the selected one or more frequency subcarriers for communication from the UE to the base station.

Figure 5:
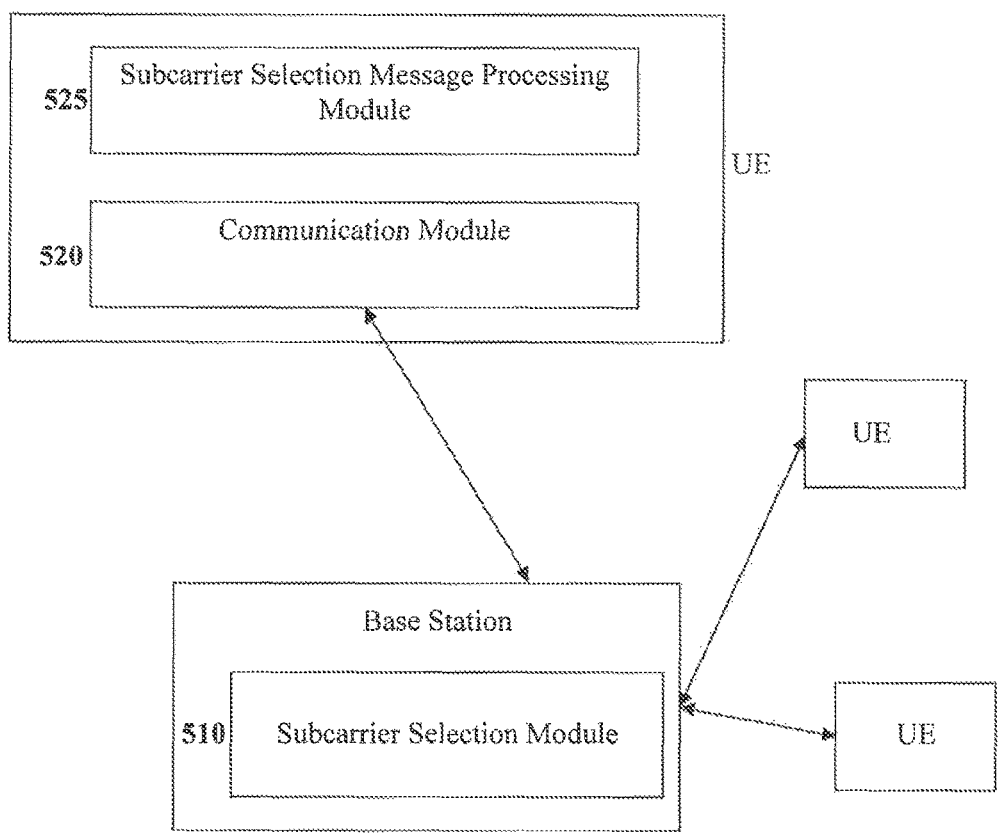
FIG. 5 illustrates a system for uplink radio resource allocation in an LTE communication system, in accordance with embodiments of the technology.

FIG. 5 illustrates a system for uplink radio resource allocation in an LTE communication system, in accordance with embodiments of the technology. The system comprises a base station having a subcarrier selection module 510 configured to select one or more frequency subcarriers within a predetermined LTE resource block. The subcarrier selection module is configured to transmit subcarrier selection messages to a UE, the messages indicative of the selected subcarriers for use thereby. The selected one or more frequency subcarriers cover less than the entire frequency range of the LTE resource block. The UE further comprises a communication module 520 configured to use the selected one or more frequency subcarriers for communication from the UE to the base station. The UE may further comprise a subcarrier selection message processing module 525 configured to receive and process the subcarrier selection messages transmitted by the base station, and to select subcarriers according to message contents.

A UE as described herein may comprise a computer processor operatively coupled to memory, along with other supporting electronics. The memory contains program instructions for executing operations to be carried out by the UE in accordance with the present technology. The functionality of the UE may be encoded in hardware, software, or firmware, or a combination thereof. The UE comprises radio communication electronics configured for communicating to and from the base station. Various hardware components of an M2M UE may be provided as would be readily understood by a worker skilled in the art.

Embodiments of the present technology provide a reduced-functionality LTE chipset, which is configured to provide the particular LTE communication capabilities as described herein. The chipset may be incorporated into user equipment such as M2M user equipment. The chipset may comprise baseband components, RF components, or both, as would be readily understood by a worker skilled in the art. In particular, the chipset may be configured to utilize selected uplink subcarriers selection as described herein. The chipset may be configured, for this purpose, to process control messages from the base station, the control messages indicative of which selected subcarriers to use.

A base station as described herein may comprise a computer processor operatively coupled to memory, along with other supporting electronics. The memory contains program instructions for executing operations to be carried out by the base station in accordance with the present technology. The functionality of the base station may be encoded in hardware, software, or firmware, or a combination thereof. The base station comprises radio communication electronics configured for communicating to and from the UE. Various hardware components of an LTE base station (eNodeB) may be provided as would be readily understood by a worker skilled in the art. The base station may comprise the subcarrier selection module and may thus be configured in part to coordinate subcarrier selection operations of the various UE's.

It will be readily understood that aspects of the technology as described herein may be provided in the form of an appropriate computer or computing system, such as a mobile terminal, UE, base station, eNB, or the like, or by a system of components in communication with each other via an LTE wireless communication network. Existing UEs and base stations may be modified in accordance with the present technology, for example by providing additional or replacement functionalities or functional modules alongside or in place of existing functionalities or functional modules. New functional modules may comprise appropriate hardware, software, firmware, or a combination thereof. For example, terminals, servers, network controllers, eNBs, and the like, may operate as described herein partially by causing a microprocessor or set of microprocessors to execute instructions stored in memory. The microprocessor in turn may cause other electronic components to operate as instructed, for example to process signals, transmit and receive radio signals, and the like. In some embodiments, hardware or firmware-enabled hardware, such as microcontrollers, digital signal processors, RF electronics components, or the like, or a combination thereof may be used and/or modified in a similar manner. In general, general-purpose or dedicated electronic components, as will be readily understood by a worker skilled in the art, will be used to implement the various functionalities as described herein. Various functionalities as described herein may be achieved via reconfiguration of existing hardware, software and/or firmware.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a solid or fluid transmission medium, magnetic or optical wire, tape or disc, or the like, for storing signals readable by a machine, for controlling the operation of a computer and/or firmware according to the method of the technology and/or to structure its components in accordance with the system of the technology.

In addition, while portions of the above discuss the technology as it can be implemented using a generic OS and/or generic hardware, it is within the scope of the present technology that the method, apparatus and computer program product of the technology can equally be implemented to operate using a non-generic OS and/or can use non-generic hardware.

Further, each step of the method may be executed on one or more appropriate computing devices, such as M2M devices, personal computers, servers, base stations, or the like, or system of computing devices, and pursuant to one or more, or a part of one or more, program elements, modules or objects generated from any programming language, such as C++, C#, Java, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. A computer-implemented method for facilitating uplink communication from a user equipment (UE) to a base station in an LTE communication system, the method comprising:
   a) selecting one or more frequency subcarriers within an LTE resource block, the selected one or more frequency subcarriers covering less than an entire frequency range of the LTE resource block, wherein the frequency range of the LTE resource block is 180 kHz, and wherein each of the one or more frequency subcarriers is selected from a contiguous range of 15 kHz subcarriers; and
   b) using the selected one or more frequency subcarriers for data communication from the UE to the base station,
   wherein one or more remaining frequency subcarriers within the LTE resource block are exclusively used by another UE to communicate to the base station in the uplink direction using OFDMA, in a manner that other UEs avoid simultaneously using the one or more remaining frequency subcarriers used by the another UE.

2. The method according to claim 1, wherein a single 15 kHz frequency subcarrier is selected.

3. The method according to claim 1, further comprising repeating steps (a) and (b) for a plurality of transmit time intervals.

4. The method according to claim 3, wherein different frequency subcarriers are selected in different ones of the plurality of transmit time intervals.

5. The method according to claim 1, wherein a number of selected frequency subcarriers for use by the UE is determined based at least in part in order to provide a predetermined level of coverage of the UE.

6. The method according to claim 1, wherein a number of transmit time intervals allocated for use by the UE is selected is such that a transmit block size (TBS) remains constant.

7. The method according to claim 1, wherein said selection of the one or more frequency subcarriers is performed by the base station, the method further comprising communicating said selection from the base station to the UE via a subcarrier selection message.

8. The method according to claim 7, wherein the subcarrier selection message indicates a schedule of frequency subcarriers to be used by the UE over a predetermined plurality of time intervals.

9. The method according to claim 8, wherein the schedule is used repeatedly by the UE.

10. A computer-implemented method for facilitating uplink communication from two or more user equipments (UEs) to a base station in an LTE communication system, the computer-implemented method comprising implementing the method of claim 1 at each of the two or more UEs, wherein each of the two or more UEs uses a non-overlapping set of frequency subcarriers for communication.

11. A LTE wireless communication system comprising:
    a user equipment (UE); and
    a base station including a subcarrier selection module, wherein:
      the subcarrier selection module is configured to select one or more frequency subcarriers within an LTE resource block for use by the UE, the selected one or more frequency subcarriers covering less than an entire frequency range of the LTE resource block, wherein the frequency range of the LTE resource block is 180 kHz, and wherein each of the one or more frequency subcarriers is selected from a contiguous range of 15 kHz subcarriers;
      the base station is configured to transmit a subcarrier selection message to the UE, the subcarrier selection message indicative of the selected one or more frequency subcarriers;
      the UE including a subcarrier selection message processing module implemented on a processor and configured to receive and process the subcarrier selection message; and
      the UE further includes a communication module implemented on a processor and configured to use the selected one or more frequency subcarriers for data communication from the UE to the base station,
    wherein one or more remaining frequency subcarriers within the LTE resource block are exclusively used by another UE to communicate to the base station in the uplink direction using OFDMA, in a manner that other UEs avoid simultaneously using the one or more remaining frequency subcarriers used by the another UE.

12. The system according to claim 11, the system comprising the UE and one or more additional UEs, wherein each of the UE and the one or more additional UEs uses a non-overlapping set of frequency subcarriers for communication to the base station, said non-overlapping set of frequency subcarriers including frequency sub-carriers contained within a common resource block but used by different ones of the UE and the one or more additional UEs.

13. The system according to claim 11, wherein the subcarrier selection module is inhibited from selecting resources near an edge of band.

14. The system according to claim 11, wherein the subcarrier selection module is configured to assign all subcarriers within a resource block.

15. The system according to claim 14, wherein the subcarrier selection module is configured to assign said all subcarriers within a resource block amongst a plurality of UE's, wherein said plurality of UE's is selected in order that each UE of the plurality is similar with respect to its budget or with respect to a metric quantifying coverage status.

16. The system according to claim 11, wherein the subcarrier selection module is configured to select a single 15 kHz frequency subcarrier for use by the designated UE in the LTE resource block.

17. The system according to claim 11, wherein the subcarrier selection message is indicative of a schedule of selected frequency subcarriers for use in a plurality of transmit time intervals.

18. The system according to claim 17, wherein different frequency subcarriers are selected in different ones of the plurality of transmit time intervals.

19. The system according to claim 11, wherein a number of transmit time intervals allocated for use by the UE is selected is such that a transmit block size (TBS) remains constant.

20. The method according to claim 1, wherein a further one or more other UEs concurrently communicate in the uplink direction via other frequency subcarriers within the LTE resource block using OFDMA.

* * * * *